United States Patent
Wang et al.

(10) Patent No.: US 9,852,114 B2
(45) Date of Patent: Dec. 26, 2017

(54) HTML5 GRAPH OVERLAYS FOR APPLICATION TOPOLOGY

(71) Applicant: VMware, Inc., Palo Alto, CA (US)

(72) Inventors: Jialiang Wang, San Jose, CA (US); Komal Nitin Mangtani, Los Altos, CA (US); Sesh Jalagam, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 320 days.

(21) Appl. No.: 14/307,997

(22) Filed: Jun. 18, 2014

(65) Prior Publication Data
US 2015/0370763 A1  Dec. 24, 2015

(51) Int. Cl.
*G06F 3/00* (2006.01)
*G06F 17/22* (2006.01)
*G06F 17/21* (2006.01)

(52) U.S. Cl.
CPC ........ *G06F 17/2247* (2013.01); *G06F 17/212* (2013.01)

(58) Field of Classification Search
CPC combination set(s) only.
See application file for complete search history.

(56) References Cited

U.S. PATENT DOCUMENTS

| | | |
|---|---|---|
| 6,011,559 A | 1/2000 | Gangopadhyay et al. |
| 6,836,821 B2 | 12/2004 | Moore et al. |
| 7,210,095 B1 | 4/2007 | Mor |
| 7,290,216 B1 | 10/2007 | Kawahara et al. |
| 7,725,820 B2 | 5/2010 | Gibbons et al. |
| 7,800,614 B2 | 9/2010 | Johnson et al. |
| 7,827,527 B1 | 11/2010 | Chiluvuri |
| 7,889,579 B2 | 2/2011 | Faue |
| 8,392,877 B1 | 3/2013 | Chiluvuri |
| 8,397,153 B1 * | 3/2013 | Lee ..................... G06F 17/211 715/204 |
| 8,429,140 B1 | 4/2013 | Lolayekar et al. |
| 8,527,943 B1 | 9/2013 | Chiluvuri |
| 8,560,671 B1 | 10/2013 | Yahalom et al. |
| 8,738,745 B1 | 5/2014 | Brandwine et al. |
| 8,910,156 B1 | 12/2014 | Kenchammana-Hosekote et al. |

(Continued)

OTHER PUBLICATIONS

U.S. Appl. No. 14/307,963, Non Final Office Action dated Sep. 22, 2016, Consists of 19 pages.

(Continued)

*Primary Examiner* — Hien Duong
(74) *Attorney, Agent, or Firm* — Patterson & Sheridan LLP

(57) ABSTRACT

A user may create a blueprint that specifies an application's architecture, including virtual machines (VM) nodes, software services and application components within the VM nodes. To do so, the user manipulates a graphical user interface (GUI) rendered by a graph layout manager and a Scalable Vector Graphics (SVG) layout engine. The SVG layout engine parses declarative layout configurations and translates the declarative layout into SVG elements that visually represent the blueprint. Additional information may be rendered in independent layers overlaid on the GUI which a user may selectively activate or de-activate to show or hide, respectively, the additional information. The layers may be generated using extension points exposed via the declarative layout.

20 Claims, 7 Drawing Sheets

(56) References Cited

U.S. PATENT DOCUMENTS

| | | |
|---|---|---|
| 8,984,448 B2 | 3/2015 | Lewin et al. |
| 9,046,982 B2 | 6/2015 | Horsman et al. |
| 9,075,631 B2 | 7/2015 | Lewin et al. |
| 9,195,362 B2 | 11/2015 | Lewin et al. |
| 2002/0109729 A1 | 8/2002 | Dutta |
| 2002/0138518 A1 | 9/2002 | Kobayashi et al. |
| 2003/0112958 A1* | 6/2003 | Beaudoin ............ H04M 3/2263 379/221.15 |
| 2003/0128390 A1 | 7/2003 | Yip et al. |
| 2004/0111672 A1 | 6/2004 | Bowman et al. |
| 2004/0111673 A1 | 6/2004 | Bowman et al. |
| 2004/0140992 A1 | 7/2004 | Marquering et al. |
| 2004/0205594 A1 | 10/2004 | Arora et al. |
| 2004/0254864 A1* | 12/2004 | Mitsuoka ............ G06Q 10/0875 705/29 |
| 2005/0015755 A1 | 1/2005 | Holmes et al. |
| 2005/0278440 A1* | 12/2005 | Scoggins ................ H04W 8/00 709/223 |
| 2006/0031749 A1 | 2/2006 | Schramm et al. |
| 2006/0041661 A1 | 2/2006 | Erikson et al. |
| 2007/0016592 A1 | 1/2007 | Ferla et al. |
| 2007/0054670 A1* | 3/2007 | Kalika ................ H04L 12/2456 455/446 |
| 2007/0118793 A1 | 5/2007 | Arora et al. |
| 2007/0180133 A1 | 8/2007 | Vedantham et al. |
| 2007/0214206 A1* | 9/2007 | Malloy ................... H04L 41/22 709/200 |
| 2007/0242082 A1* | 10/2007 | Lathrop ............ G06F 17/30271 345/619 |
| 2008/0095176 A1 | 4/2008 | Ong et al. |
| 2008/0208790 A1 | 8/2008 | Oshima et al. |
| 2008/0244595 A1 | 10/2008 | Eilam et al. |
| 2008/0262833 A1 | 10/2008 | Kano et al. |
| 2010/0088624 A1 | 4/2010 | Bligh et al. |
| 2010/0094819 A1 | 4/2010 | Bornhoevd et al. |
| 2010/0122192 A1 | 5/2010 | Hanna |
| 2010/0171750 A1 | 7/2010 | Eberhard et al. |
| 2010/0322527 A1 | 12/2010 | Fablet et al. |
| 2011/0029882 A1* | 2/2011 | Jaisinghani ............ H04L 41/12 715/736 |
| 2011/0072353 A1 | 3/2011 | Le Pennec et al. |
| 2011/0126129 A1 | 5/2011 | Nagahara et al. |
| 2011/0161792 A1* | 6/2011 | Florence ........... G06F 17/30882 715/205 |
| 2011/0280550 A1 | 11/2011 | Shimada et al. |
| 2012/0192047 A1 | 7/2012 | Slatter et al. |
| 2012/0192092 A1 | 7/2012 | Slatter et al. |
| 2012/0303670 A1 | 11/2012 | Gillen et al. |
| 2012/0330984 A1 | 12/2012 | Fablet et al. |
| 2013/0019189 A1 | 1/2013 | Stewart et al. |
| 2013/0132850 A1* | 5/2013 | Subramanian .......... H04L 41/12 715/735 |
| 2013/0145118 A1 | 6/2013 | Liu et al. |
| 2013/0151707 A1 | 6/2013 | Boutin et al. |
| 2013/0232463 A1 | 9/2013 | Nagaraja et al. |
| 2013/0232480 A1 | 9/2013 | Winterfeldt et al. |
| 2013/0232497 A1 | 9/2013 | Jalagam et al. |
| 2013/0232498 A1 | 9/2013 | Mangtani et al. |
| 2013/0246924 A1 | 9/2013 | Tan et al. |
| 2013/0305130 A1 | 11/2013 | Slatter et al. |
| 2014/0019899 A1 | 1/2014 | Cheng et al. |
| 2014/0025816 A1* | 1/2014 | Otani .................... G06F 9/5072 709/225 |
| 2014/0028685 A1 | 1/2014 | Weskamp et al. |
| 2014/0379898 A1* | 12/2014 | Schmit ................ H04L 41/0856 709/224 |
| 2015/0113453 A1 | 4/2015 | Thimbleby |
| 2015/0242204 A1* | 8/2015 | Hassine .................... G06F 8/61 717/121 |
| 2015/0370445 A1 | 12/2015 | Wang et al. |

OTHER PUBLICATIONS

U.S. Appl. No. 14/307,963, Final Office Action dated Jan. 12, 2017, 22 pages.

U.S. Appl. No. 14/307,981, Final Office Action dated Feb. 9, 2017 Consists of 15 pages.

* cited by examiner

HTML5 GRAPH OVERLAYS FOR APPLICATION TOPOLOGY

CROSS-REFERENCE TO RELATED APPLICATION(S)

This application is related to U.S. patent application Ser. No. 14/307,963, entitled "HTML5 Graph Layout for Application Topology," and to U.S. patent application Ser. No. 14/307,981, entitled "Connection Paths for Application Topology", all of which are assigned to the assignee of this application, have been filed on the same day of this application, and the entire contents of which are incorporated by reference herein.

BACKGROUND

HyperText Markup Language 5 (HTML5) is an increasingly popular markup language used for structuring and presenting content for the World Wide Web. One component of HTML5 is Scalable Vector Graphics (SVG), which is an XML-based vector image format for describing two-dimensional graphics applications and images, and a set of related graphics script interfaces. While SVG is a powerful graphic specification, SVG lacks native support for a layout mechanism. As a result, a developer must specify absolute positions and sizes for all SVG elements, including text, images, backgrounds, and shapes, within the elements' containers. Manually specifying these absolute positions and sizes greatly reduces developer productivity and raises the cost of application maintenance. As such, there are challenges for developers seeking to create a web-based graphical user interface that renders complex graphical topologies and figures.

SUMMARY

Accordingly, one or more embodiments provide a graph layout manager and a Scalable Vector Graphics (SVG) layout engine that parses declarative layout configurations and translates the declarative layout into SVG elements to render complex graphical topologies. In one example use case, the SVG layout engine may generate a graphical user interface (GUI) for creating application blueprints that specify an application's architecture, including virtual machines (VM) nodes, software services and application components within the VM nodes. The application blueprints define the structure of the application, enable the use of standardized application infrastructure components, and specify installation dependencies and default configurations. The application blueprints define the topology for deployment in an infrastructure-agnostic manner to be portable across different cloud computing environments. The SVG layout engine dynamically calculates absolute positions and sizes of child elements based on the declarative layout to visually represent the application blueprint. In some embodiments, additional information may be rendered in independent layers overlaid on the application blueprint which a user may selectively activate or de-activate to show or hide, respectively, the additional information.

Embodiments of the present disclosure provide a method of generating a user interface. The method includes determining positions of a plurality of nodes and a plurality of child elements within a plurality of nodes according to a declarative layout. The nodes and child elements visually represent a topology of virtual computing resources and application components executing thereon. The declarative layout includes an extension point associated with a first child element of the plurality of child elements. The method further includes generating a base layer comprising a first plurality of scalar vector graphics (SVG) elements that renders the plurality of nodes and the plurality of child elements at the determined positions. The method includes generating a second layer comprising a second plurality of SVG elements based on the extension point associated with the first child element. The method includes rendering, on a display device, a graphical user interface comprising the base layer and the second layer, wherein the second layer is rendered overlaid on the base layer.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
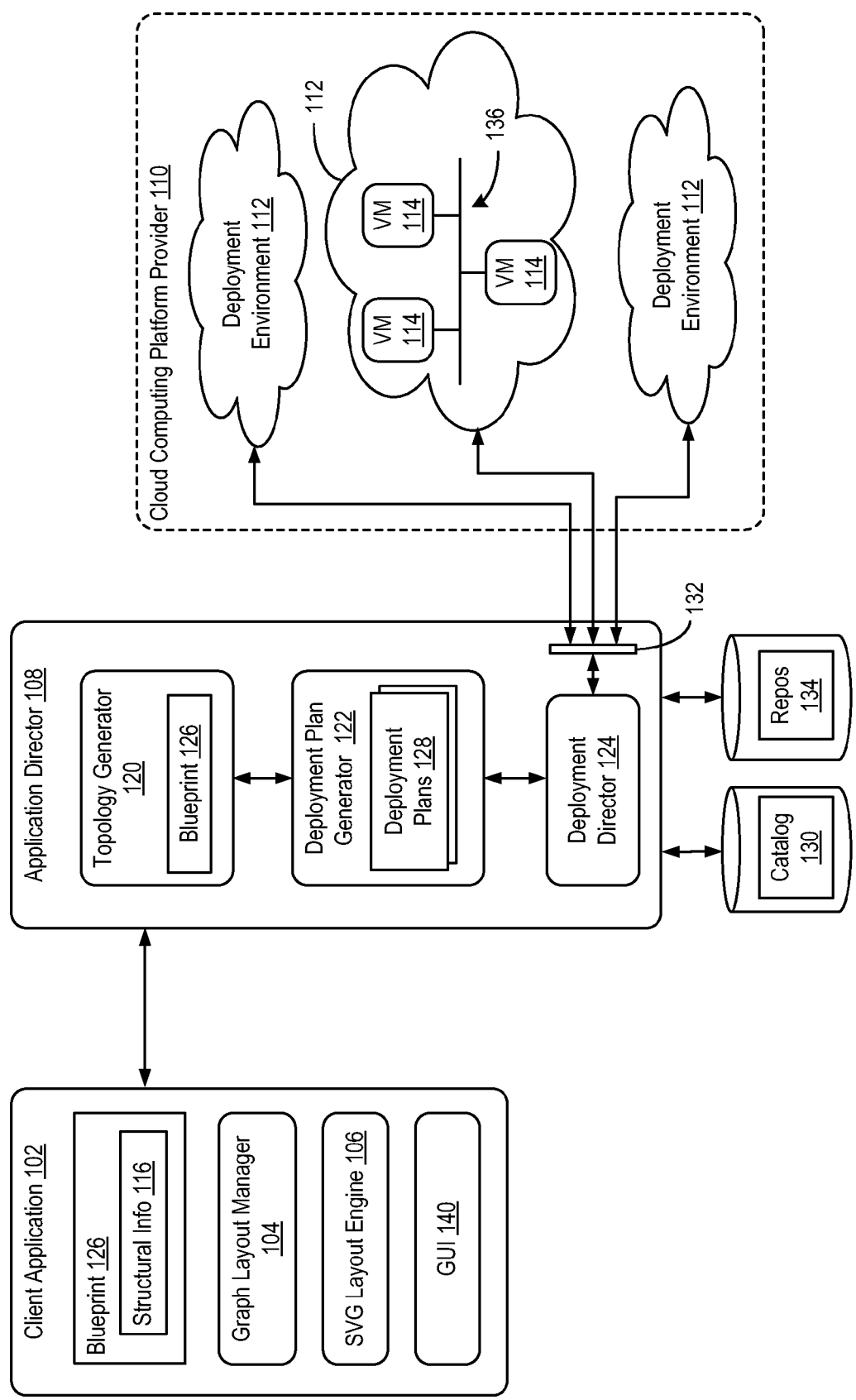
FIG. 1 depicts a system for generating a blueprint of an application to be deployed in a cloud computing environment, according to one embodiment of the present disclosure.

FIG. 1 depicts a system 100 for generating a blueprint of an application to be deployed in a cloud computing environment, according to one embodiment of the present disclosure. Via user input selections, a client application 102 interacts with an application director 108 to generate a blueprint 126 that specifies a logical topology of an application 136 to be deployed. Client application 102 and application director 108 may be software applications running in different hosts and/or virtual machines (not shown) in a client-server relationship, or on a same host or virtual machine (VM). In one embodiment, application director 108 may be a web-based application that may be accessed via client application 102, e.g., a web browser, although other implementations may be used. Client application 102 may be configured to render a graphical user interface (GUI) 140 on a display device (not shown) communicatively connected to the host and/or virtual machine on which client application 102 executes.

In one embodiment, client application 102 includes a graph layout manager 104 and a Scalable Vector Graphics (SVG) layout engine 106 configured to render a blueprint 126 for creation of a new blueprint or modification of an existing blueprint in a GUI 140 of client application 102. In one embodiment, graph layout manager 104 may be responsible for the position and sizing of overall blueprint layouts, line connections, cross-node dependencies. SVG layout engine 106 may be responsible for relative position of text and decoration within each node. In one embodiment, graph layout manager 104 and SVG layout engine 106 may be client-side libraries of scripting code provided by application director 108 and executable by client application 102 to programmatically render graphical elements of GUI 140 on a display device. In some implementations, e.g., where application director 108 is a web-based application, graph layout manager 104 and SVG layout engine 106 are JavaScript libraries downloaded from application director 108 to render a GUI 140 comprised of web documents, e.g., HTML, SVG, Cascading Style Sheets (CSS). For example, when a user directs client application 102 to access a Uniform Resource Locator (URL) pre-assigned to application director 108, application director 108 may return in response web documents (e.g., HTML, CSS, SVG), client-side code (e.g., JavaScript, in-line or linked files) which may include graph layout manager 104 and SVG layout engine 106, and multimedia files (e.g., GIFs, Flash, MPEGs) that client application 102 uses to render GUI 140. While the present disclosure describes functions performed by each of client application 102 and application director 108, it should be recognized that other embodiments may differently distribute functions between client application 102 and application director 108, i.e., shift functionality to server-side or client-side.

In operation, a user (e.g., software developer) may access application director 108 via client application 102 to design a topology for and orchestrate deployment of a multi-tier application 136 onto one of deployment environments 112 provided by a cloud computing platform provider 110. In one implementation, the user may utilize a graphical user interface provided by application director 108 to assemble and arrange items from a catalog into an application blueprint 126, for an application to be deployed, that includes a logical topology of virtual computing resources and application components for supporting application 136. Cloud computing platform provider 110 (sometimes referred to simply as "cloud provider") may provide multiple deployment environments 112, for example, for development, testing, staging, and production of the application. Services may be accessed from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which the user can deploy its multi-tier application. One particular example of a deployment environment is one implemented using cloud computing services from a vCloud DataCenter available from VMware, Inc.

In one embodiment, application director 108 includes the following software modules: a topology generator 120, a deployment plan generator 122, and a deployment director 124. Topology generator 120 generates a blueprint 126 that specifies a logical topology of the application 136 to be deployed. As mentioned earlier, blueprint 126 generally captures the structure of an application 136 as a collection of application components executing on virtual computing resources.

Blueprint 126 provides a visual representation of an applications' architecture, including, in one embodiment, one or more virtual machines (VMs) nodes, software services within the VM nodes, executable components within the VM nodes or software services. Blueprint 126 further provides a visual representation of component dependency connections. The dependency connections represent the architectural relationship between blueprint components and affect various lifecycles of the application. For instance, if a service A depends on service B, during deployment, the installation and configuration of service A will be waiting for the completion of service B. In some embodiments, blueprint 126 may visually represent one or more logical networks, for example, via visual aids to conventionally distinguish and manage logical networks between VM nodes.

For example, blueprint 126 generated by application director 108 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is recognized that the term "application" is used herein to generally refer to a logical deployment unit, comprised of application packages and their dependent middleware and operating systems. As such, in the example described above, the term "application" may refer to the entire online store application, including application server and database components, rather than just the application logic of the web application itself.

Blueprint 126 may be assembled out of items from a catalog 130, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. Catalog 130 may be pre-populated and customized by an administrator (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, the user may specify a dependency from an Apache service to an application code package.

Deployment plan generator 122 of application director 108 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 136. Different deployment plans 128 may be generated from a single blueprint 126 to test prototypes (e.g., new application versions), to scale-up and scale down deployments, or deploy application 136 to different deployment environments 112 (e.g., testing, staging, production).

Deployment director 124 of application director 108 executes deployment plan 128 by communicating with cloud computing platform provider 110 via a cloud interface 132 to provision and configure VMs 114 in a deployment environment 112, as specified by deployment plan 128. Cloud interface 132 provides a communication abstraction layer by which application director 108 may communicate with a heterogeneous mixture of cloud provider 110 and deployment environments 112. Deployment director 124 provides each VM 114 with a series of tasks specific to the receiving VM 114 (herein referred to as a "local deployment plan"). The tasks may be scripts that are executed by VMs 114 to install, configure, and/or start one or more application components. For example, a task may be a script that, when executed by a VM 114, causes VM 114 to retrieve and install particular software packages from a central package repository 134. Deployment director 124 coordinates with VMs 114 to execute the tasks in an order that observes installation dependencies between VMs 114 according to deployment plan 128. After application 136 has been deployed, application director 108 may be utilized to monitor and modify (e.g., scale) the deployment.

Figure 2:
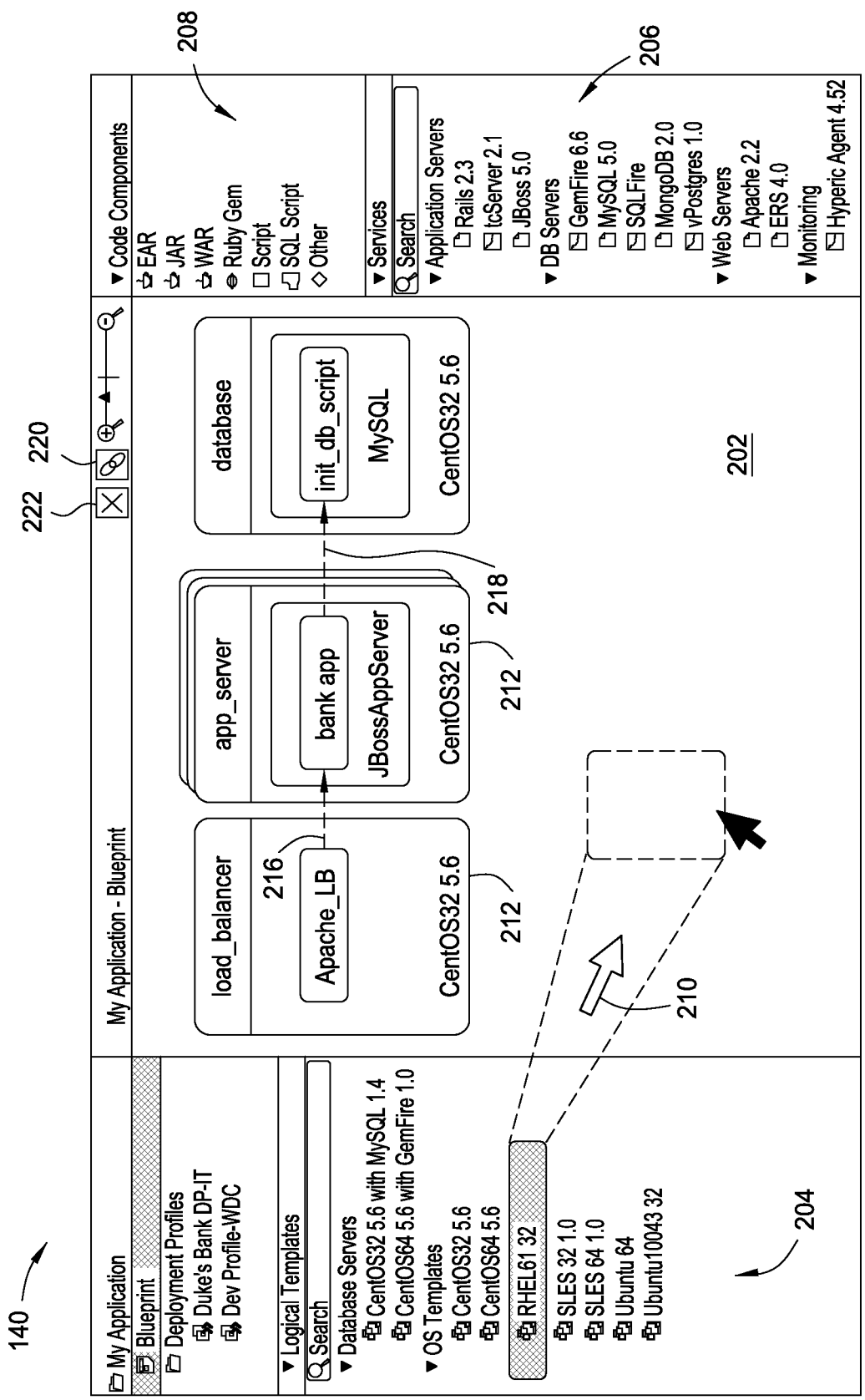
FIG. 2 illustrates an example graphical user interface for specifying an application blueprint for an application to be deployed.

FIG. 2 illustrates an example graphical user interface 140 for specifying a blueprint 126 for an application to be deployed. GUI 140 includes a canvas 202 that provides a graphical view of a blueprint 126 as a schematic diagram of application 136. GUI 140 may include one or more "palettes" that display items from catalog 130 that are available for use in creating a blueprint. Canvas 202 is configured to provide drag-and-drop functionality that enables the user to select and drag an item from the palettes and drop the selected item within the boundaries of canvas 202 to insert the selected item into blueprint 126, as illustrated by arrow 210.

In one embodiment, graph layout manager 104 is configured to generate one or more "nodes" 212, which visually represent virtual computing resources (e.g., a virtual machine, or a cluster of virtual machines) configured according to a user's selection. Graph layout manager 104 may be configured to initially generate nodes for GUI 140 upon first loading of GUI 140, and may be configured to modify GUI 140 to add, remove, or modify the nodes responsive to user input (e.g., user drags in a new VM). SVG layout engine 106 is configured to generate graphical elements that render contents of node 212 in GUI 140 according to techniques described herein.

In the embodiment shown in FIG. 2, GUI 140 includes a first palette 204 that lists logical templates defined in and available from catalog 130, a second palette 206 that lists software services defined in and available from catalog 130, and a third palette 208 that lists types of code components that may be inserted into a blueprint. A blueprint may include any resource, and a resource can be any of virtual machines, guest operating systems, application services, any network/storage resources (e.g., load balancers, storage arrays), or other software resources like Active Directory entries.

A blueprint may include one or more instances of logical templates, which specify virtual computing resources for a virtual machine, such as CPU, memory, networking, storage, guest operating system, pre-installed installed runtime environments (e.g., Java Runtime Environment), and application services and commands (e.g., ssh, wget). For example, one logical template may specify a virtual machine having a 2 GB of RAM, a dual-core CPU, and pre-installed guest operating system CentOS version 5.6 supporting 32-bit architecture, while another logical template may specify a virtual machine having Red Hat Enterprise Linux 6.1 supporting 64-bit architecture. Logical templates enable application director 108 to define an application topology in a cloud-agnostic manner. In some embodiments, the logical templates may be mapped to virtual machine templates made available by cloud provider 110 (referred to herein as "cloud templates".)

In one example, to create a blueprint that models a three-tiered application, a user may select three items from palette 204 of logical templates, drag the items onto canvas 202, and create three nodes representing each tier of the application. In the example shown in FIG. 2, a three-tiered application with a database backend, an application server, and a load balancer is visually represented by three nodes 212 (labeled as "load_balancer," "app_server," and "database"). Each node 212 has been created from a logical template (identified as "CentOS32 5.6") having CentOS 5.6 32-bit operating system installed.

A blueprint 126 may further include one or more application components, such as software services and code components, to be installed on a virtual machine for supporting execution of an application. Code components refer to application-specific binaries, scripts, or processes, for example, written by a developer and packaged into one or more files, to provide logic for the application. In catalog 130, code components are represented as types or formats of scripting and application code. Examples of types of code components include Java Archive (JAR) files, Java Enterprise Archive (EAR) files, Java web application archive (WAR) files, Ruby Gems packages, SQL scripts, and other suitable modules of scripting logic. Services are scripted software that provide a software infrastructure for an application, and are generally reused in multiple applications. Examples of services include application servers (e.g., Rails, Apache Tomcat, JBoss), database servers (e.g., GemFire, MySQL, SQLFire, MongoDB, Postgres), monitoring services (e.g., Hyperic, SpringInsight), web servers (e.g., Apache, VMware vFabric Enterprise Ready Server), messaging services (e.g., RabbitMQ), and other middleware services.

In one embodiment, application components may be added to a node 212 within canvas 202 to specify which application components are to execute on the node. For example, the user may select an application component (e.g., code component, software service) from palettes 206, 208 and drag the item into a node 212 within canvas 202 to specify the node should have the selected item executing therein. In the example three-tiered application in FIG. 2, a user has added a MySQL database item, a JBoss application server, and an Apache web server from palette 206 of services to nodes 212. Each node may host multiple application components. Some application components, such as services, may host, execute, and/or deploy certain application components themselves, such as code components. In the three-tiered application example above, the user specifies an application component packaged as an EAR file (identified as "bank_app") as being deployed in the JBoss application server. In another example, the user may specify an SQL script (identified as "init_db_script") that is executed by the MySQL database to initialize the database.

In one embodiment, graph layout manager 104 may be configured to render deployment-related dependencies 216, 218 between application components and/or nodes within canvas 202. The user may select two application components within canvas 202 using a pointer cursor in GUI 140, and create a dependency between the application components via a link button 220. It is appreciated that the user may later use a pointer cursor to select an existing dependency and delete and/or modify the selected dependency, for example, by pressing a delete button 222. In the three-tiered application example shown in FIG. 2, a dependency from the Apache load balancer to code component (e.g., "bank_app") is depicted by dashed arrow 216 and represents that the Apache load balancer should be deployed after the installation of the code component (e.g., "bank_app") is completed. Similarly, a second dependency (depicted by dashed arrows 218) from the code component (e.g., "bank_app") to the database initialization script (e.g., "init_db_script") is created to represent that the code component (e.g., "bank_app") should wait until the database node, the database service, and the SQL script initializing the database have all been run before continuing.

In one embodiment, blueprint 126 is rendered using Scalable Vector Graphics (SVG), which is an XML-based vector image format supported by web browsers and other applications (e.g., client application 102). SVG layout engine 106 is configured to parse a declarative layout configuration and translate the declarations into actual SVG elements that render content within a node 212. SVG layout engine 106 is configured to determine positional informational for child elements within a node 212, and generate SVG elements including text, images, and graphic shapes that visually represent the child elements within each node 212, using the determined positional information. It is recognized that, while embodiments herein are described in detail using SVG, the disclosed techniques for generating a graphical user interface may be applied using other image formats including other vector-based formats and raster-based formats.

Figure 3:
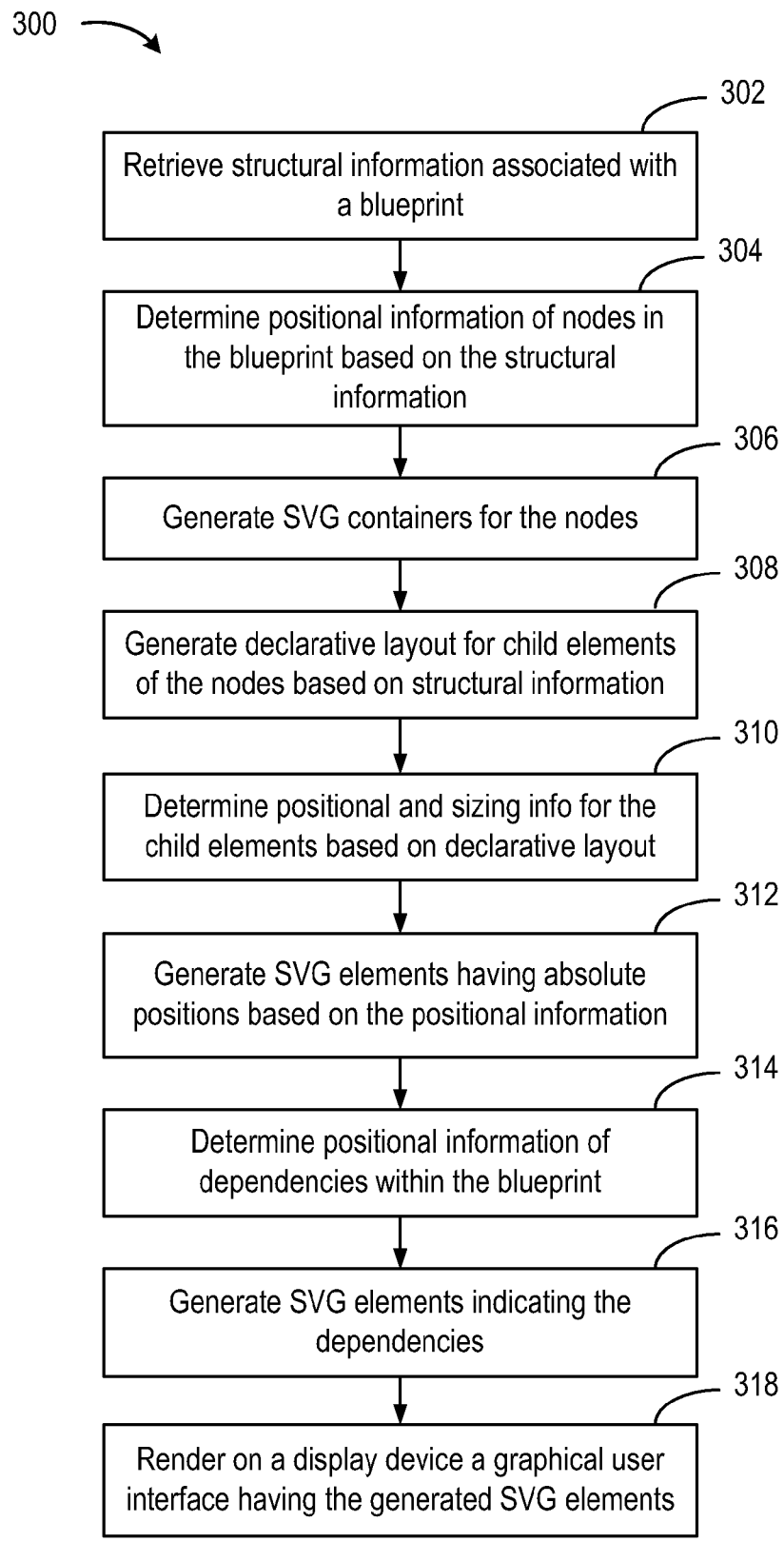
FIG. 3 is a flow diagram of a method for generating a graphical user interface of an application for specifying a logical topology, according to one embodiment of the present disclosure.

FIG. 3 is a flow diagram of a method 300 for generating a graphical user interface of an application (e.g., application director 108) for specifying a logical topology, according to one embodiment of the present disclosure. Method 300 for generating a GUI may be performed in response to user input requesting to create a new blueprint 126 or modify an existing blueprint 126. While method 300 is described in conjunction with the system shown in FIG. 1, it is recognized that other systems may be utilized to perform the method described herein.

At step 302, graph layout manager 104 retrieves from application director 108 structural information associated with a blueprint. The structural information specifies a logical topology comprised of nodes, application components within the nodes, and deployment dependencies between the application components and/or the nodes. In one implementation, graph layout manager 104 may retrieve structural information formatted in a JavaScript Object Notation (JSON) format via a REST API provided by application director 108, although other data formats and other techniques for transmitting data may be utilized.

In one example, the structural information associated with the example blueprint shown in FIG. 2 may be a data structure containing a first entry corresponding to a first node ("load_balancer"), a second entry corresponding to a second node ("app_server"), and a third entry corresponding to a third node ("database"). Each entry may specify the content within the corresponding node. For example, the first entry may specify a label associated with the first node ("load_balancer"), the logical template associated with the first node ("CentOS32 5.6"), and any application components contained within the first node, such as the software service Apache Load Balancer. Content within a node may be specified in a nested manner, i.e., as child elements of the node parent element. For example, the second entry corresponding to the second node may include a child element corresponding to the application component JBoss Application Server, which itself includes a child element corresponding to a code component ("bank_app").

At step 304, graph layout manager 104 of client application 102 determines positional information of nodes in blueprint 126 based on the structural information. In one embodiment, where the structural information is contained an array-like data structure, graph layout manager 104 steps through each entry in the structural information and assigns a logical position to each node within canvas 202. A logical position as used herein refers to abstract positional information distinguished from pixel-based coordinate values. For example, graph layout manager 104 may process the structural information and assign a first logical position at (0,0) to the first node, a second logical position at (0,1) to the second node, and a third logical position at (0,2) to the third node. Graph layout manager 104 may further iterate through each level in the structural information and specify logical positions for content within each node. For example, the Apache load balancer component within the first node may be assigned a first logical position (0,0) relative to the first node.

At step 306, graph layout manager 104 generates one or more SVG container elements for the nodes based on the determined positional information. Each SVG container element may correspond to a node. In one implementation, graph layout manager 104 generates an <svg> element that creates an SVG document fragment which may exist inside another document, such as an HTML document, or canvas 202, and which has its own viewport and coordinate system. In other implementations, other SVG container or structural elements, such as the <g> element used to group together elements, may be used. In one embodiment, graph layout manager 104 determines and sets absolute positions of the SVG containers within canvas 202.

As used herein, generating an SVG element (e.g., container elements, shapes, graphics elements, text content elements) may refer to using client-side scripting code to programmatically generate and/or modify an object inserted into a Document Object Model (DOM) of GUI 140. For example, a method call such as createElement(namespace, "svg") may be used to instantiate an SVG element of a specified tag (e.g., "svg"). A method call such as setAttribute ("x", value) may be used to specify or dynamically modify one or more attributes of an SVG element. A method call such as appendChild( ) may be used to dynamically insert the SVG element into the DOM for rendering. It is recognized that client application 102 may be configured to automatically re-render GUI 140 or portion of GUI 140 on the display device in response to changes (e.g., insertions) to the DOM. While the described techniques may be implemented using programmatic manipulation of SVG elements, it is understood that, in some embodiments, generating an SVG element may include generation of markup text including one or more tags (e.g., <svg>, </svg>, <polygon>, etc.) and the one or more attributes that define the SVG element.

At step 308, graph layout manager 104 generates a declarative layout for child elements of the nodes based on structural information 116. The child elements in a node and the layout of those child elements may be specified in a list of item declarations. In one embodiment, the item declarations associated with the child elements in the nodes may be generated by graph layout manager 104 while processing the structural information (i.e., in step 304). For example, in one implementation, graph layout manager 104 may traverse structural information 116, and responsive to encountering a particular type of topology component (e.g., node, software service, code component, etc.), generate and insert a corresponding item declaration for that type of topology component into a growing data structure to build a declarative layout. In other embodiments, the item declarations associated with the child elements in the nodes may be contained in the structural information as retrieved from application director 108. An example declarative layout for content in the nodes is shown in Table 1 below. While Table 1 depicts one particular syntax for item declarations formatted as a JSON data structure, it is understood that other syntaxes and data structure formats may be used.

TABLE 1

Sample item declarations

```
01  [ {
02      gtype: 'rect',
03      width: '100%',
04      height: '100%',
05      attrs: {
06          stroke: 'black'
07      }
08  }, {
09      layout: {
10          type: 'vbox',
11          margin: 5
12      },
13      items: [ {
14          gtype: 'text',
15          attrs: {
16              text: 'Line 1'
17          }
18      }, {
19          gtype: 'text',
20          attrs: {
21              text: 'Line 2'
22          }
23      } ]
24  } ]
```

The example shown in Table 1 includes a first item declaration (i.e., lines 02-07) specifying a box, and a second item declaration specifying two lines of text within the box (i.e., lines 09-23). Item declarations may be defined in a hierarchical manner, such that one item declaration can contain "child" item declarations. For example, the second item declaration contains two sub-items corresponding to a first line of text (i.e., lines 13-18) and a second line of text (i.e., lines 18-23).

At step 310, SVG layout engine 106 parses the declarative layout and determines positional and sizing information for the child elements based on the declarative layout. SVG layout engine 106 may determine absolute positions, heights, and widths for each child element in a node based on the declarative layout. In one implementation, SVG layout engine 106 performs multiple passes on the declarative layout, for example, by first calculating heights and widths of elements, then calculating absolute positions of those elements as offset by the heights and widths of neighboring elements. The absolute positions of an SVG element may be specified as X-axis and Y-axis coordinate values relative to an ancestor SVG container element corresponding to a node, or in some embodiments, relative to canvas 202. For example, the absolute positions of an SVG element within a node may be specified relative to a coordinate system having an (0,0) location at the upper left corner of a node, such that X-axis coordinates increase rightward and Y-axis coordinates increase downward, although other coordinate systems may be used. It is understood that while the present disclosure may express positional information and sizing information in terms of pixel values, other units of measurement may be used, such as centimeters, millimeters, inches, picas, points, units relative to the default font size (i.e., em), units relative to the height of a particular font character (i.e., ex).

TABLE 2

Sample SVG document based on item declarations

```
<rect width="100" height="100" stroke="black" fill="none"></rect>
<text x="5" y="16" width="90">Line 1</text>
<text x="5" y="36" width="90">Line 2</text>
```

Figure 4:
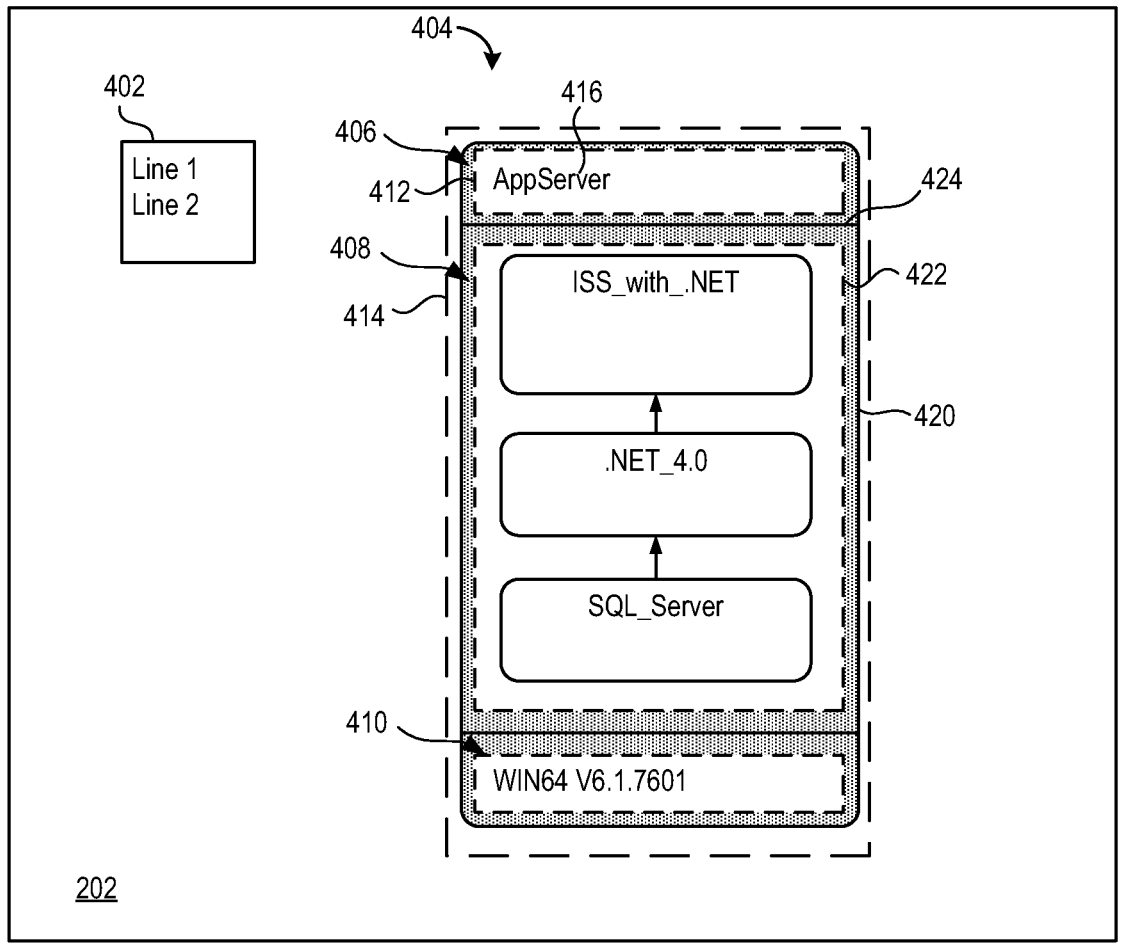
FIG. 4 is a block diagram depicting a layout model for child elements within a node specified by one or more item declarations, according to one embodiment of the present disclosure.

Assuming an SVG container component size is 100×100, SVG layout engine 106 may translate the example item declarations of Table 1 into the SVG document shown above in Table 2. To create the resultant SVG document, SVG layout engine 106 calculates the absolute positions and sizes of child elements based on properties specified by the item declarations, e.g., width, height, and margin properties. SVG layout engine 106 determines a 100-pixel width and height for the <rect> element based on the "width:100%" and "height:100%" specified in the item declaration. SVG layout engine 106 further determines the absolute position of "x=5" for the text elements based on the "margin:5" specified in the item declaration. SVG layout engine 106 further determines the absolute position of "y=16" for the first text element, and determines the absolute position of "y=36" for the second text element, which accounts for the margin (i.e., 5) and the height of the first text element (i.e., 20) preceding the second text element. It is recognized that the text elements have a Y-coordinate of "16" and "36" instead of "5" and "25" because SVG text element's Y-coordinate starts with their baseline instead of their top by default, and SVG layout engine 106 automatically offsets the text based on the text element's height. The SVG elements shown in Table 2 are rendered to display two lines of text within a box 402, as depicted in FIG. 4.

Each item declaration may specify a plurality of properties for the associated child element, which are used in translating the declaration into actual SVG elements. A graphics type property (e.g., "gtype") specifies a type of graphical element the item declaration is associated with. In some embodiments, the graphics type property corresponds to a specific SVG element, e.g., a "rect" graphics type declares the item as an SVG rectangular shape element (<rect>); a "text" graphics type declares the item as an SVG text content element (<text>) element. It is recognized that the graphics type property does not necessarily have a strict one-to-one mapping with particular SVG elements, and does not necessarily assign a property value that is the same as the SVG tag, and that the graphics types may define a logical type that ultimately maps to any, including multiple, SVG element(s).

In one embodiment, an item declaration may include one or more attribute properties (e.g., "attrs") specifying attribute values for SVG elements. SVG layout engine 106 parses the attribute properties and may include the attribute values directly into the SVG element. Some attribute values may be "passed" through directly to the resultant SVG element, such as the "stroke:'black'" attribute (i.e., line 06 of Table 1) of the <rect> element. In another example, SVG layout engine 106 parses a text attribute property specifying the textual data of the respective text element (i.e., lines 16 and 21 of Table 1), and inserts the textual data as the SVG text element's content.

In one embodiment, an item declaration may specify a layout property indicating a type of layout for determining positional information of one or more associated child elements in sequence. The layout property may specify a directional layout (e.g., horizontal, vertical) where child elements within that layout are positioned one after another in sequence in a particular direction, for example, in a top-to-bottom direction for a vertical layout, and in a left-to-right direction for a horizontal layout. SVG layout engine 106 calculates the absolute position of each child element as the position of a previous child element offset by at least the dimensions of the previous child element.

For example, SVG layout engine 106 parses the second item declaration in Table 1 specifying a vertical layout (i.e., "type: 'vbox'") and calculates the position of the second line of text to be the position of the first line of text offset vertically by at least the height of the first line of text. In another example, SVG layout engine 106 may parse an item declaration specifying a horizontal layout (e.g., "type: 'hbox'") and calculates the position of a child element to be the position of the previous child element offset horizontally by at least the width of the previous child element. It is understood that other types of layouts may be utilized. In some embodiments, if no layout is explicitly specified, a pre-determined default layout may be applied. For example, a default layout (i.e., "type: 'auto'") places the child element using absolute positions within the current container. Even with absolute positioning, the child element may take advantage of dynamic layout calculation to support width and height in percentage of parent dimensions and margins.

In some embodiments, the layout property may specify one or more sub-properties that are applied to the positioning of all child elements associated with the layout property. The layout property may include a margin property that applies a margin around all child elements associated with the layout property. For example, in response to parsing the second item declaration in Table 1 specifying a margin property of 5 pixels (i.e., line 11: "margin: 5"), SVG layout engine 106 calculates the position of a child element to be the position of the previous child element offset vertically by a 5 pixel margin in addition to the height of the previous child element. In some embodiments, the layout property may specify an alignment value (e.g., "align: center") which enables one or more child elements to be horizontally or vertically and/or left-, center-, or right-aligned within its respective container. In response to parsing an item declaration containing an alignment property, SVG layout engine 106 may calculate a position of a child element based on the position and size of the child element's parent element and further based on the calculated size of the child element itself. For example, for a horizontally-centered child element, SVG layout engine 106 may calculate the position of the child element based on 50% of the width of the parent element offset by 50% of the width of the child element itself.

In one embodiment, as item declarations may be nested within other item declarations, it is recognized that layouts may be nested within other layouts. FIG. 4 is a block diagram depicting a layout model for child elements within a node specified by one or more item declarations. A node 404 rendered within canvas 202 includes a polygon shape 420, and a header portion 406, a main portion 408, a footer portion 410 and line shapes 424 arranged in a vertical layout. Child elements of header portion 406 having a horizontal layout (depicted as a box 412) is nested within an overall vertical layout (depicted as a box 414) for portions 406, 408, 410. For example, header portion 406 includes title text 416 ("AppServer") positioned according to a horizontal layout. Child elements within main portion 408 may also have its own layout (depicted as box 422) for positioning application components, depicted as a combination of rectangular elements and text elements "ISS_with.NET", ".NET_4.0", and "SQL_Server". In the example shown, the item declaration for child elements within main portion 408 specify a horizontally centered layout for the application components. Child elements within footer portion 410 includes template text ("WIN64 V6.1.7601") indicating the logical template associated with the node is positioned according to another horizontal layout.

In one embodiment, SVG layout engine 106 may be configured to support layout flex, where remaining space in a node is dynamically allocated to child elements based on their respective flex value. An item declaration may specify a flex value that indicates a weighted value relative to other flex values according to which sizing information for an element is changed (i.e., "flexed") based on any remaining space. SVG layout engine 106 may increase (or even decrease) the size of a child element by a proportion of remaining space based on the child element's flex value relative to the total flex value of all child elements. For example, a first child element with a flex value of "2" among two other child elements having a flex value of "1" would have its width increased by an amount of 50% of the remaining space. Flex values may include both horizontal and vertical flex values for allocating remaining space to widths and heights of child elements, respectively.

In one embodiment, SVG layout engine 106 may be configured to support automatic text truncation based on the text size and dimensions of the text's parent elements. SVG layout engine 106 may determine that an item declaration associated with a text element specifies a text truncation property (e.g., "text-trunc: ellipsis"). SVG layout engine 106 then determines whether the full text within the text element as rendered according to a given text size would exceed the boundaries of the text element's parent element(s). If so, SVG layout engine 106 truncates a portion of the full text such that that text element does not exceeds the boundaries, taking into account margins and other layout requirements. SVG layout engine 106 generates an SVG text element having the truncated text, and optionally includes an ellipsis character or other indication that the text has been truncated.

Referring back to FIG. 3, at step 312, SVG layout engine 106 generates a plurality of SVG elements having absolute positions and sizes based on the determined positional information. SVG layout engine 106 generates one or more SVG elements having attributes specified according to the determined positional and sizing information. In one embodiment, for each item declaration, SVG layout engine 106 may call a method such as createElement(<tagname>)

to instantiate a SVG element of a specified tag (e.g., "text", "rect") based on the graphics type property specified by the item declaration. SVG layout engine 106 may call a method, e.g., setAttribute(<name>, <value>), that sets position attributes (e.g., "x", "y") and size attributes (e.g., "height", "width") of the generated SVG element according to the determined positional and sizing information. SVG layout engine 106 may call a method call, e.g., appendChild(child) that inserts the generated SVG element into the node for rendering.

At step 314, graph layout manager 104 determines positional information of dependencies between application components within the blueprint, if any. In response to SVG layout engine 106 calculating positional and sizing information for child elements within the nodes, graph layout manager 104 may proceed to determine positional information for drawing shapes (e.g., lines, arrows) connecting child elements within a node and child elements between nodes. In other words, after SVG layout engine 106 has finished calculating the absolute positions of a first application component and a second application component, graph layout manager 104 may determine where to draw a line connecting the application components that visually represents a dependency between the application components, such as dependency 218 shown in FIG. 2.

At step 316, graph layout manager 104 generates one or more SVG element(s) indicating the dependencies between application components and/or nodes of the blueprint. The generated SVG elements that visually represent the dependencies may include the determined positional information. For example, graph layout manager 104 may generate an SVG line element having "x1" and "y1" attributes associated with a starting position of the dependency and "x2" and "y2" attributes associated with an ending position of the dependency.

At step 318, client application 102 renders, on a display device, a GUI 140 including the plurality of generated SVG elements representing an application blueprint, which includes SVG containers, SVG elements corresponding to child elements of the nodes, and SVG elements indicating deployment dependencies. It is recognized that, rather than generate the GUI entirely at once, client application 102 may render portions of GUI 140 comprising subsets of the generated SVG elements in an iterative manner and/or in an intermittent manner as SVG elements are generated according to method 300 (e.g., after steps 306, 312, 316, etc.)

While embodiments disclosed herein are discussed with regards to generating an initial GUI for a blueprint, operations for modifying an existing GUI based on changes to the blueprint may be performed utilizing techniques described herein. In one embodiment, graph layout manager 104 may detect a change to application blueprint 126 in response to user input. For example, a user may insert a new node into canvas 202, remove an existing node from canvas 202, insert a new application component within a node, move an application component to a different node, add or remove dependencies between application components and/or nodes.

In response to detecting a change to the blueprint, graph layout manager 104 may modify structural information 116 of blueprint 126 to reflect the detected change. Graph layout manager 104 may insert a new entry into structural information 116 representing a newly added node, delete an entry from structural information 116 corresponding to a deleted node, insert or delete child elements into structural information 116 corresponding to changes of application components. In one embodiment, graph layout manager 104 may then recalculate positional information for nodes in the blueprint. For example, insertion of a new node may bump other nodes into new logical positions, while in other embodiments, deletion of an existing node may result in no change in other nodes' logical position to improve visual stability and reduce GUI changes that are disorienting to the user. Graph layout manager 104 and SVG layout engine 106 may proceed to render blueprint 126 based on structural information 116, as described above. In some embodiments, graph layout manager 104 and SVG layout engine 106 may clear out and completely re-render canvas 202 using the updated structural information. In other embodiments, graph layout manager 104 and SVG layout engine 106 may modify only those portions of the GUI affected by the change in structural information 116.

Graph Overlays for Application Topology

In one or more embodiments, application blueprint 126 may be considered "base layer" for the entire application lifecycle, providing the fundamental information of the application topology, the VM nodes, software services, and application components, and their dependency connections. Graph layout manager 104 is configured to add, as overlays, an extensible set of additional information as overlays on top of these fundamental elements to further describe the application in various lifecycles. Overlays in an application blueprint 126 are applied via a layered mechanism. Each layer serves as a particular purpose of annotation and may be dynamically added or removed from application blueprint 126, e.g., in response to a user selecting or deselecting a particular layer.

For example, graphical user interface 140 may display the list of available layers to a user in a layers portion 224, depicted in FIG. 2 as a legend area. The user may select one or more layers to be overlaid on application blueprint 126 by selecting checkboxes 226 to toggle the corresponding layer, although other types of user input elements may be used. In some cases, the user might activate a "Deployment" layer to describe the application in the deployment lifecycle. In other cases, the user might activate a "Network" layer to describe the logical networks connected to various components of application 136.

Figure 5:
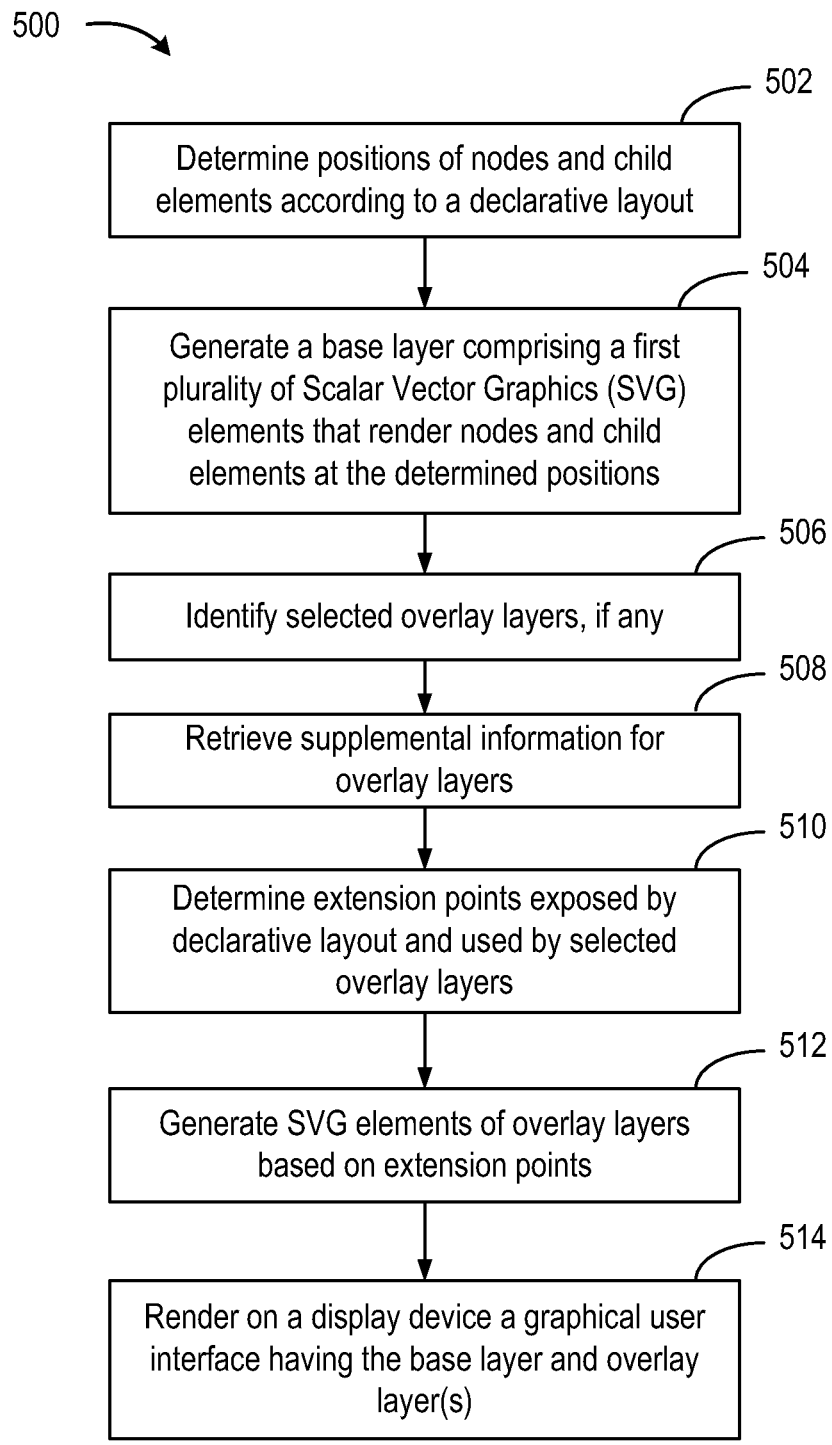
FIG. 5 is a flow diagram of a method for generating a graphical user interface for an application blueprint having overlay information, according to one embodiment of the present disclosure.

FIG. 5 is a flow diagram of a method 500 for generating a graphical user interface for an application blueprint having overlay information, according to one embodiment of the present disclosure. While the method 500 is described in conjunction with the system shown in FIG. 1, other systems may be utilized to perform the method described herein.

At step 502, graph layout manager 104 determines positions of a plurality of nodes and a plurality of child elements within the nodes according to a declarative layout. The nodes and child elements visually represent a topology of virtual computing resources and application components executing thereon. It is understood that graph layout manager 104 may use SVG layout engine 106 to parse a declarative layout for child elements of the nodes and determine positional and sizing information for the nodes and the child elements within the nodes (e.g., step 304, step 308, step 310, step 314 of method 300 described earlier). The declarative layout specifies the child elements in a node and the layout of those child elements in a list of one or more item declarations.

At step 504, graph layout manager 104 generates a base layer comprising a first plurality of SVG elements that renders the plurality of nodes and the plurality of child elements at the determined positions. As mentioned above, the base layer may be comprised of nodes, application components drawn within the nodes, and dependencies drawn between the application components and/or nodes. It is understood that graph layout manager 104 may use SVG layout engine 106 to generate a base layer comprising SVG elements that render application blueprint 126 based on the determined positional and sizing information (e.g., step 306, step 312, step 316 of method 300 described earlier).

Figure 6:
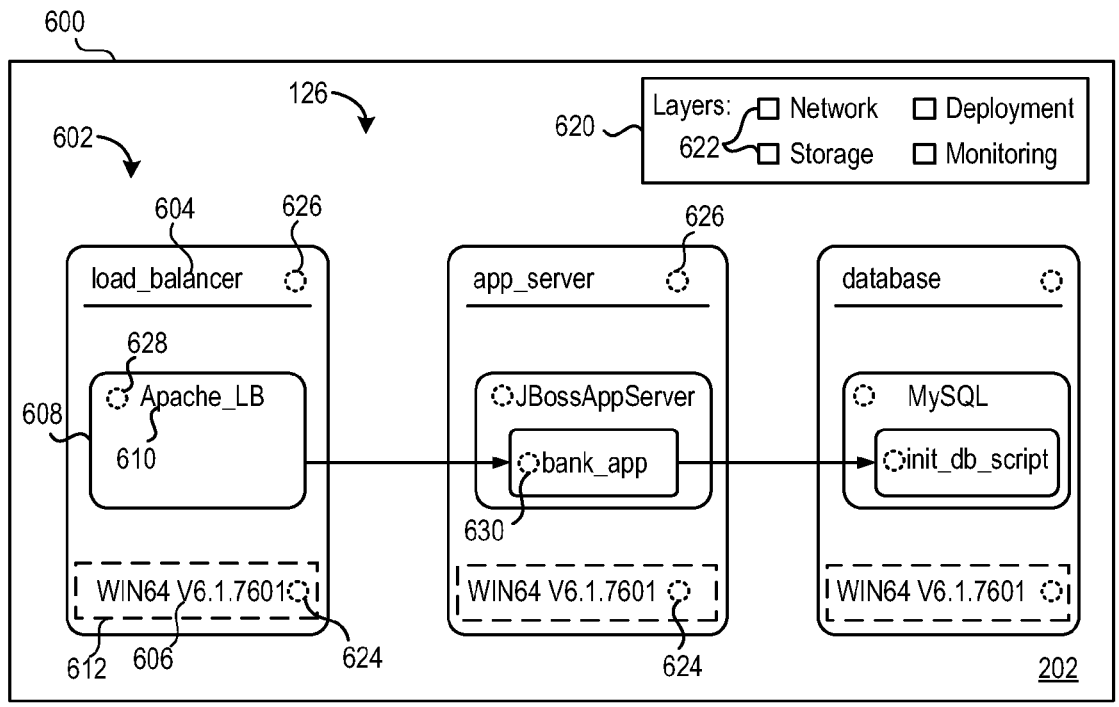
FIG. 6 is a block diagram depicting an example graphical user interface for an application blueprint with extension points, according to one embodiment of the present disclosure.

FIG. 6 is a block diagram depicting an example graphical user interface 600 for an application blueprint 126 with extension points, according to one embodiment of the present disclosure. Graphical user interface 600 includes a base layer comprised of SVG elements rendered within canvas 202 that visually represent the topology of virtual computing resources and application components for application blueprint 126. In the embodiment shown, the base layer includes SVG rectangle elements (e.g., element 602) that visually represent the nodes and application components and SVG text elements that label the nodes and application components.

For example, a first SVG text element 604 renders the text label "load_balancer" associated with a first node 602, and a second SVG text element 606 renders the text "WIN64 V6.1.7601" specifying the logical template associated with the guest operating system (i.e., a VM having a Win64 guest operating system pre-installed). For clarity of illustration, boundary boxes for SVG text elements 604, 606 are shown in phantom with dashed lines. In another example, an SVG rectangle element 608 and a SVG text element 610 (i.e., "Apache_LB") are rendered as child elements within node 602 to visually represent an application component installed in node 602.

Referring back to FIG. 5, at step 506, graph layout manager 104 identifies one or more selected layers. In some embodiments, graph layout manager 104 may receive user input indicating a user's selection of one or more layers of information to be overlaid on the base layer. For example, in graphical user interface 600 shown in FIG. 6, graph layout manager may detect a selection of one or more layers based on a selection of checkboxes 622 in a legend portion 620. It is recognized that selection of a layer results in graph layout manager 104 generating and displaying that layer within graphical user interface 600; de-selection of a layer results in removal or hiding of that layer within the graphical user interface. Examples of overlay layers include: an overlay layer that provides monitoring information and performance data of a deployed application, an overlay layer that provides indications to the user of whether a deployment of an application was successful (see FIG. 7), an overlay layer that provides storage and clustering configuration options to nodes of an application blueprint (see FIG. 8), and an overlay layer that draws logical networks interconnecting nodes of an application blueprint (see FIG. 9), although other types of overlay layers may be provided.

At step 508, responsive to detecting user selection of one or more layers, graph layout manager 104 retrieves supplemental information associated with the selected overlay layers. The supplemental information includes the additional data to be visually represented, and graphical information needed to render the overlay layers. The supplemental information includes data associated with nodes and application components of the logical topology. In one example, the supplemental information associated with an overlay layer may be a data structure containing a first entry corresponding to a first node ("load_balancer"), a second entry corresponding to a second node ("app_server"), and a third entry corresponding to a third node ("database"). In some embodiments, each entry may specify the supplemental content within a corresponding node, although entries in the supplemental information need not strictly correspond to entries in structural information 116. For example, based on a user's selection of a "deployment status" layer, graph layout manager 104 retrieves data specifying the deployment status associated with each node and application component in the application blueprint. In another example, based on a user's selection of a "network" layer, graph layout manager 104 retrieves data specifying networks connecting the nodes. In one implementation, graph layout manager 104 may retrieve supplemental information similar to structural information, i.e., formatted in a JavaScript Object Notation (JSON) format via a REST API provided by application director 108, although other data formats and other techniques for transmitting data may be utilized.

The retrieved supplemental information may further include references to one or more extension points provided by the base layer for rendering the supplemental information overlaid. In one implementation, for each selected overlay layer, graph layout manager 104 may instantiate a class object associated with the respective selected overlay layer and configured to handle rendering the overlay layer. For example, upon detecting the user has selected an overlay layer that provides storage and clustering configuration options to nodes of an application blueprint, graph layout manager 104 instantiates a Disk Layer object, which extends an AbstractLayer class, to handle rendering of the storage overlay layer.

At step 510, graph layout manager 104 determines extension points that are exposed by the declarative layout and that are used by selected overlay layers. In one or more embodiments, the declarative layout may specify extension points associated with particular nodes or child elements within the nodes. Extension points in the declarative layout provide a plugin-like mechanism for overlying information on top of SVG elements of the base layer.

In one or more embodiments, an item declaration for a topology component may include an extension point property indicating the topology component is exposed for purposes of overlay layers. The extension point property may be declared by assigning a name or identifier property to a container element or child element. In such cases, the "name" of a child element as specified in its item declaration serves as a reference point by which overlay layers can insert and position graphical elements relative to that child element or container. As such, any named container element within a graph component could be used as an extension point. An example item declaration with extension point(s) is shown in Table 3. While Table 3 depicts a particular syntax for item declarations with extension points formatted as a JSON data structure, it is understood that other syntaxes and data structure formats may be used.

TABLE 3

Sample item declarations with extension points

```
01  {
02      id: 'footerContainer',
03      layout: {
04      type: 'hbox',
05      margin: 5,
06      valign: 'middle'
07      },
08      items: [ {
09      gtype: 'text',
10      halign: 'center',
11      flex: 1,
12      attrs: {
13          text: this.osVersionName
```

TABLE 3-continued

Sample item declarations with extension points

```
14      }
15        } ]
16    }
```

Table 3 shows an item declaration for a footer section of a topology component, i.e., a node. The footer section uses a horizontal layout (i.e., "type: 'hbox'") and has a child element displaying the operating system version name (i.e., lines 08-15). The whole footer section has an identifier (i.e., "footerContainer"), which registers this container element as an extension point named footerContainer within the node. SVG layout engine 106 parses this item declaration, generates a corresponding SVG text element 606, and tracks the extension point associated with container element 612. An extension point 624 associated with container element 612 of node 602 is depicted in FIG. 6 by a circle shown in phantom. Also depicted in FIG. 6 are extension points 626 associated with named container elements (not shown) containing title header text 604, extension points 628 associated with named container elements (not shown) containing application components 608, and an extension point 630 for nested application components contained within a node. It should be recognized that extension points 624, 626, 628 are merely depicted in FIG. 6 for purposes of illustration, rather than be actually rendered within graphical user interface 600. It should be further recognized that item declarations for other graphical elements of application blueprint 126 have been omitted for brevity.

Graph layout manager 104 may identify extension points specified in the declarative layout while parsing the declarative layout to determine positional and sizing information (e.g., step 502). Graph layout manager 104 and SVG layout engine 106 parse these item declarations, and tracks the extension points associated with the container elements or child elements while generating the corresponding SVG elements. In other embodiments, graph layout manager 104 may re-process the declarative layout in search of specific extension points used by a selected overlay layer, i.e., as referenced by the supplemental information retrieved at step 508.

In one embodiment, graph layout manager 104 generates new item declarations for content of an overlay layer based on the retrieved supplemental information. Graph layout manager 104 may insert the new item declarations within the existing item declarations for an application blueprint 126, such that the content for an overlay layer may be rendered using similar techniques and workflows for rendering topology components of application blueprint 126 described earlier. In one implementation, graph layout manager 104 may use method functions of the instantiated class object associated with the overlay layer to handle translating data within structural information 116 and the supplemental information into one or more item declarations, an example of which is shown in Table 4.

TABLE 4

Sample overlay layer definition

```
01  /**
02   * Add disk layer before the rendering.
03   */
04  beforeComponentRender: function(component) {
05      var isNode = component instanceof BlueprintNodeComponent;
```

TABLE 4-continued

Sample overlay layer definition

```
06      var hasDisk = isNode && component.model.get('nodeDisk');
07
08      if (hasDisk) {
09          var diskIcon = {
10              gtype: 'image',
11              id: 'diskIcon',
12              width: 20,
13              height: 20,
14              attrs: {
15                  href: '/images/graph/blueprint/disk.png'
16              },
17              listeners: {
18                  click: function(event) {
19                      component.dispatchEvent('selectDisk',
20                                            component);
21                  }
22              }
23          };
24
25          component.addChild(diskIcon, 'footerContainer');
26      }
27  }
```

Table 4 shows example code of a method for rendering content of an overlay layer. This code snippet is within a DiskLayer class that extends AbstractLayer class. The beforeComponentRender( ) function defined in the AbstractLayer class gives the layer the opportunity to update a topology component when the topology component and its model have matching configurations. It is recognized that the example function may be executed for each topology component (e.g., nodes, application components) rendered for the application blueprint.

The depicted function checks whether the target component is a node (i.e., "component instanceof BlueprintNodeComponent") and whether the node component has supplemental information associated with the DiskLayer (i.e., "get('nodeDisk')"). If so, the disk layer generates an item declaration (i.e., lines 09-25) that specifies content of the disk layer, namely, a child element for a disk icon widget. The item declaration may include graphic type properties, attribute properties, etc., for rendering an SVG element as described earlier. The generated item declaration may further include one or more event listener properties that specify event handlers for the SVG element, such as a click event handler that dispatches a click event to canvas 202 for event handling (i.e., lines 17-22).

As shown in Table 4, the disk layer determines extension points that are exposed by the declarative layout and that are used by this particular DiskLayer, namely "footercontainer." The disk layer adds the item declaration for the disk icon widget to the extension point named footerContainer (i.e., line 25). In one implementation, a layer uses an addChild( ) function on a topology component to provide more features to that topology component. The addChild( ) function defined in each GraphComponent class, provides the ability to dynamically add SVG elements in a declarative manner, into extension points defined within the graph component. The new child elements that a layer adds to a topology component are also managed by the layout manager of the extension point container. In the above example, a new disk icon is added horizontally after existing operating system version label 606. To place the disk icon before operating system version label 606, the layer may provide an insertion index when calling the addChild function, for example, component.addChild(this.getDiskIcon( ), 'footerContainer', 0).

At step 512, graph layout manager 104 generates the selected overlay layer comprised of SVG elements based on the extension points. Graph layout manager 104 may determine the absolute position and sizes for SVG elements of the overlay layer based on the absolute positions of the extension points. Based on the supplemental information of the overlay layer, graph layout manager 104 generates SVG elements to render text content, lines, polygons, images (e.g., icons), and other graphics of the selected overlay layer at the determined positions. Graph layout manager 104 uses the extension points to render the supplemental information of an overlay layer within a localized context of the logical topology of nodes and application components modeled in application blueprint 126.

In some embodiments, graph layout manager 104 may organize the generated SVG elements of an overlay layer under a common container to which common operations may be applied to all SVG elements of the overlay layer. For example, all SVG elements of a networking layer may be organized under one container (e.g., SVG <g> element), while all SVG elements of a deployment status layer may be organized under another container. Such organization may facilitate operations such as show/hide operations in response to a user's selection/de-selection of the overlay layer. In such cases, graph layout manager 104 may modify the common container to be made visible or invisible and the attribute is inherited by the SVG elements of that overlay layer. In other embodiments, graph layout manager 104 may tag each generated SVG element of an overlay layer with an attribute value associated with the overlay layer. For example, graph layout manager may modify all SVG elements of a networking layer to set the "class" attribute to include a "layer_network" value corresponding to the networking layer. In such embodiments, graph layout manager 104 may retrieve any SVG elements having the "layer_network" class attribute (e.g., via the Document Object Model) to perform bulk operations on the overlay layer.

In some embodiments, generating an overlay layer may require changing the size of elements within a base layer, such as a node or application component. For example, insertion of an icon within an application component may require the application component to be resized to accommodate the inserted icon and existing text. In some embodiments, graph layout manager 104 may trigger a "resize" event which causes the underlying base layer to be re-generated.

At step 514, client application 102 renders, on a display device, a GUI 140 including the plurality of generated SVG elements of the base layer, and the plurality of generated SVG elements of the overlay layer(s). In one embodiment, client application 102 renders the SVG elements of the one or more overlay layer(s) overlaid on top of the base layer, although it should be recognized that the other embodiments using transparency or partial transparency are within the scope of the present disclosure. It is recognized that, rather than render the GUI entirely at once, client application 102 may render portions of GUI 140 comprising subsets of the generated SVG elements in an iterative manner and/or in an intermittent manner as SVG elements are generated according to method 500 (e.g., after steps 504, 512, etc.)

In one or more embodiments, client application 102 may pre-render one or more overlay layers for performance reasons. In such embodiments, rather than wait until a user selects an overlay layer, graph layout manager 104 retrieves the supplemental information for overlay layers ahead of time, for example, when receiving structural information for the base layer. In some embodiments, graph layout manager may generate SVG elements for the overlay layers and mark them as invisible or hidden until a user makes their selection.

While embodiments described herein generate an overlay layer in response to user selections, operations for rendering an overlay layer may be performed in response to change in the underlying base layer. In one embodiment, graph layout manager 104 may detect a change to the base layer which triggers changes to any activated overlay layers. For example, a user might modify an application blueprint 126 (i.e., the base layer) by moving an application component from one node to another node, or insert a new node which shifts the positions of existing nodes. Graph layout manager 104 notifies overlay layers that an element with an extension point is changed in the base layer, and that one or more child elements of the overlay layer may have to be re-drawn. As such, graph layout manager 104 can modify or re-generate an overlay layer based on the modified position of the extension point.

Figure 7:
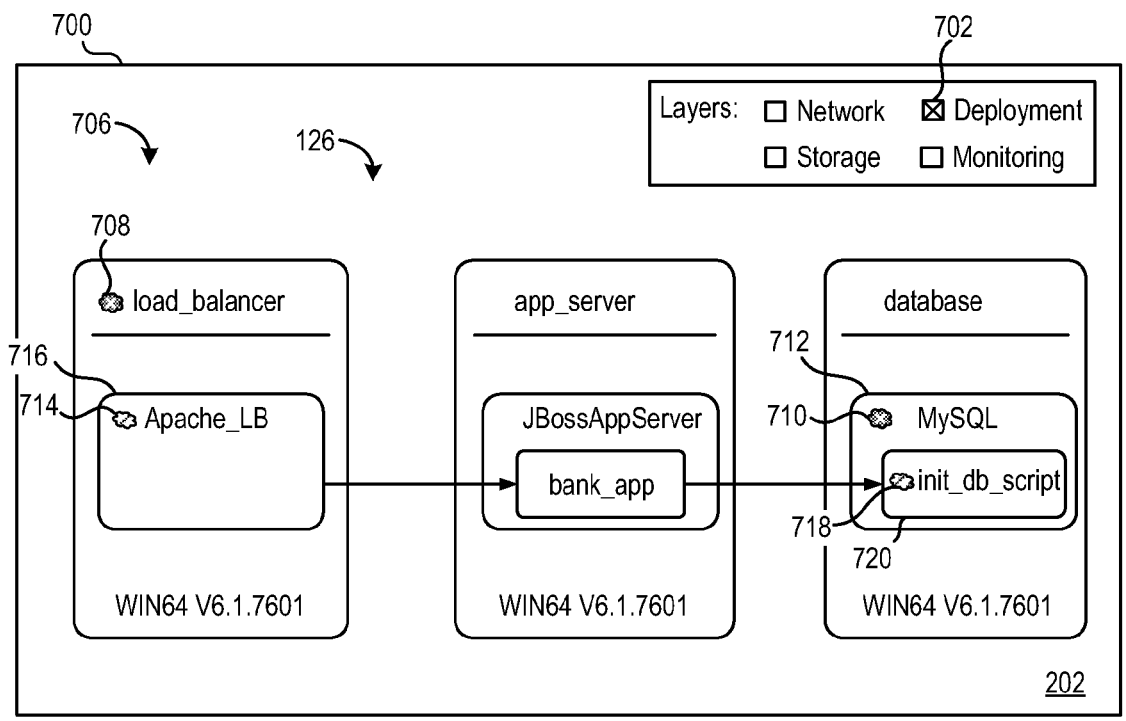
FIG. 7 through 9 are block diagrams depicting an example graphical user interface for an application blueprint with example overlay layers, according to embodiments of the present disclosure.

FIG. 7 is a block diagram depicting an example graphical user interface 700 for an application blueprint 126 with example overlay layers, according to one embodiment of the present disclosure. Graphical user interface 700 depicts an application blueprint 126 having a "deployment status" overlay layer rendered within canvas 202. In some cases, a user may deploy an application modeled according to application blueprint 126 within a deployment environment, as described above. To check on its status, the user might activate a deployment status overlay layer by selecting a corresponding UI element (e.g., UI element 702).

A deployment status overlay layer provides indications to the user of whether a deployment of an application was successful. The deployment status overlay layer includes indications of deployment status at localized points within application blueprint 126. In response to a user selecting the deployment status overlay layer (e.g., via UI element 702), graph layout manager 104 retrieves deployment status information associated with each node and application component contained in application blueprint 126 (i.e., the base layer). Graph layout manager 104 identifies extension points associated with each node and application component for which there is deployment status information, and determines positions on the base layer for rendering content of the deployment status overlay layer.

In one embodiment, graph layout manager 104 may generate status icons at localized points of the base layer to visually represent whether the underlying node or application component was successfully deployed. In the example shown in FIG. 7, the deployment status layer includes an error icon 708 inserted in a first node 706 representing the load balancer VM to indicate an error occurred while deploying the load balancer VM and an error icon 710 inserted in application component 712 representing the MySQL database to indicate an error occurred while deploying the MySQL database. The example deployment status layer further includes "grey" icons 714, 718 inserted in application component 716 (representing an Apache server) and in application component 720 (representing a database initialization script) to indicate the Apache server and database initialization script did not start for some reason.

To generate the deployment status layer, graph layout manager 104 determines the location of an extension point used by the layer and generates an SVG element having an absolute position at that location. For example, graph layout manager 104 generates error icon 708 with an absolute position at an upper-left corner of first node 706 representing the load balancer VM. In another example, graph layout manager 104 inserts error icon 710 with an absolute position at an upper-left corner of application component 712 representing the MySQL database. In one implementation, graph layout manager 104 generates an SVG image element (e.g., "<image>") that renders a raster image for the status icon. While the example deployment status layer is depicted in FIG. 7 using particular status icons, it should be recognized that other status icons may be used, such as a "green" status icon indicating a successful deployment. It should be further recognized that the deployment status layer may use additional and/or alternative graphical indications to visually represent the deployment status, such as rectangle elements of a particular color rendered to surround failed nodes.

Figure 8:
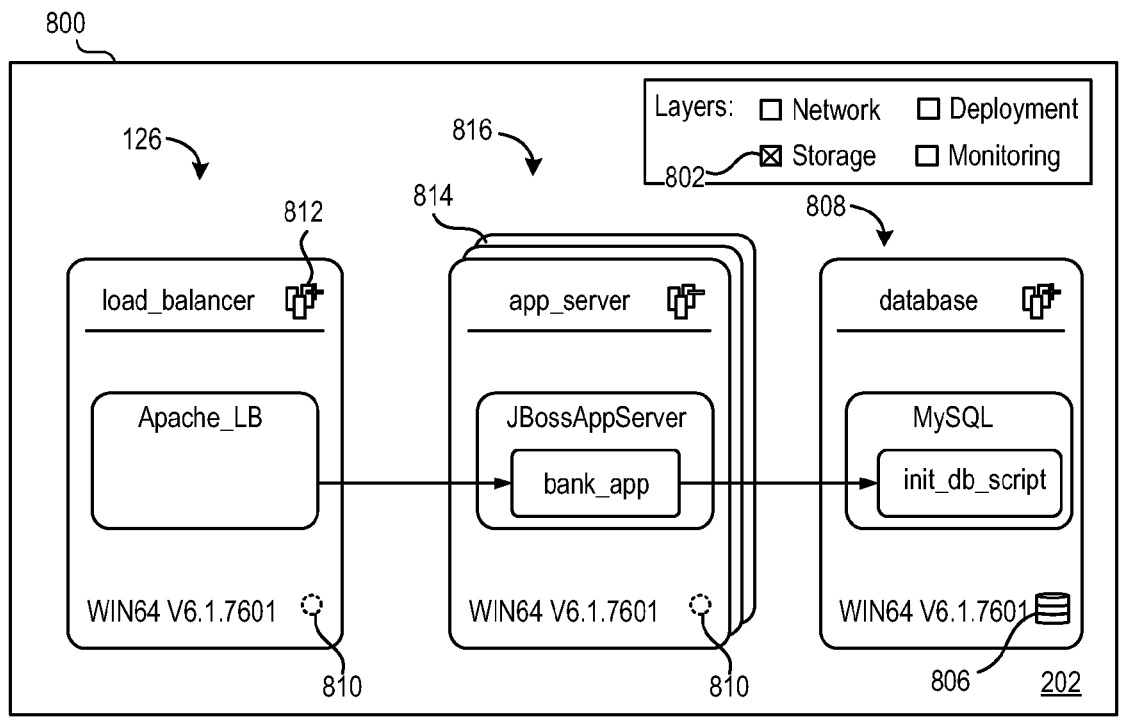

FIG. 8 is a block diagram depicting an example graphical user interface 800 for an application blueprint 126 with example overlay layers, according to one embodiment of the present disclosure. While a user is actively modeling an application by creating an application blueprint 126, certain technical details may be omitted from the graphical user interface for sake of clarity of the logical topology being created. In some cases, a user may wish to view or modify such details, such as storage-specific information as related to application blueprint 126. The user may activate a storage overlay layer by selecting the corresponding UI element (e.g., UI element 802).

Graphical user interface 800 depicts an application blueprint 126 having a "storage" overlay layer rendered within canvas 202. A storage overlay layer provides information to the user related to the storage capabilities of each node within application blueprint 126. In some embodiments, the storage overlay layer includes user interface elements associated with storage at localized points within application blueprint 126.

In response to a user selecting the storage overlay layer (e.g., via UI element 802), graph layout manager 104 retrieves disk information associated with each node in application blueprint 126 (i.e., the base layer). Graph layout manager 104 identifies extension points associated with each node (e.g., extension points 810) for which there is disk information, and determines positions on the base layer for rendering content of the storage overlay layer. In one implementation, graph layout manager 104 determines the location of an extension point used by the storage layer and generates an SVG element having an absolute position at that location. For example, graph layout manager 104 generates a disk configuration icon 806 with an absolute position at a lower-right corner of a node 808 representing a database VM. In one embodiment, graph layout manager 104 may generate SVG elements that render user interface elements that may be interacted with by a user. For example, disk configuration icon 806 may be a button configured to receive mouse clicks from a user and, in response, launch a menu for configuring storage options for the respective node.

It should be recognized that other per-node details may be displayed in an overlay layer, such as a clustering layer also depicted in FIG. 8. As shown, graph layout manager 104 may generate a clustering overlay layer that renders cluster buttons 812 at each node for enabling or disabling clustering for each node in application blueprint 126, and displays a stacked background 814 that visually represents a cluster is enabled for a respective node.

Figure 9:
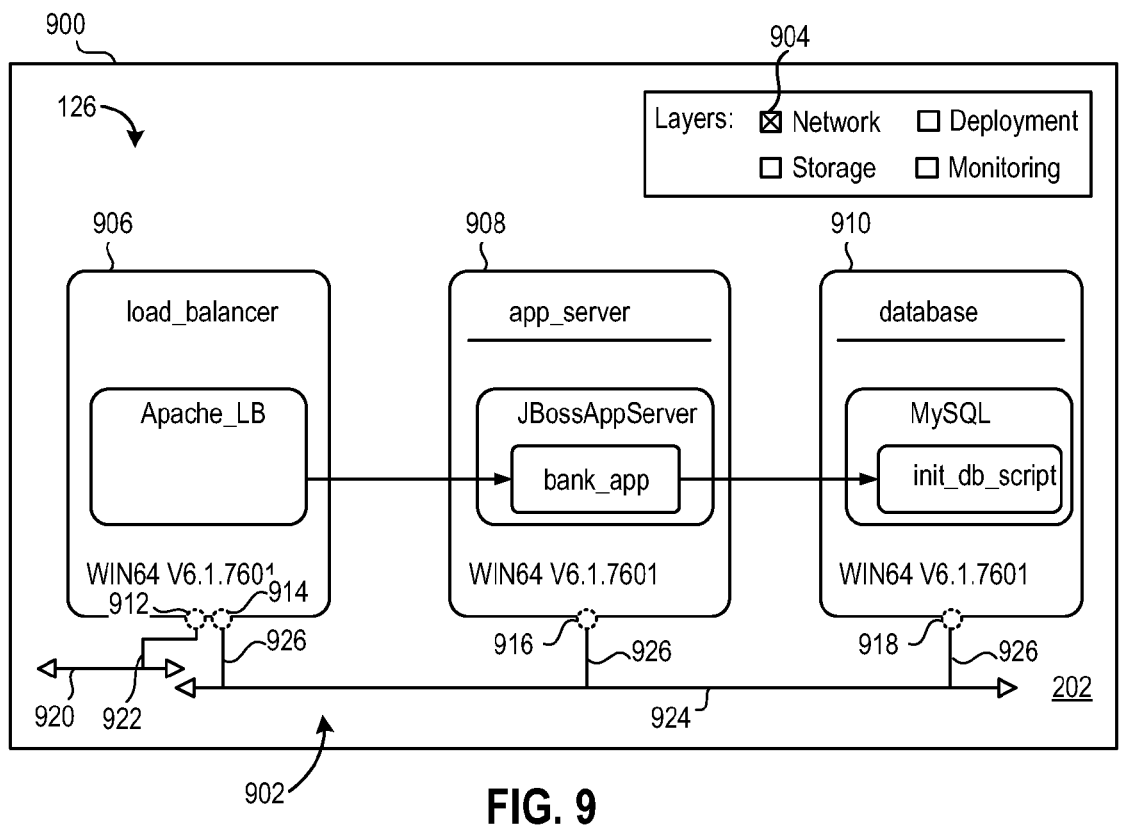

FIG. 9 is a block diagram depicting an example graphical user interface 900 for an application blueprint 126 with an example network overlay layer, according to one embodiment of the present disclosure. Graphical user interface 900 depicts an application blueprint 126 having a base layer comprised of nodes 906, 908, 910 and a network overlay layer 902 rendered within canvas 202. A network overlay layer 902 visually represents one or more communications networks that interconnect or will interconnect nodes 906, 908, 910 of application blueprint 126 within a deployment environment.

In response to a user activating network overlay layer 902 (e.g., via UI element 904), graph layout manager 104 retrieves networking information associated with each node contained in application blueprint 126 (i.e., the base layer). Graph layout manager 104 identifies extension points associated with each node for which there is networking information, and determines positions on the base layer for rendering content of network overlay layer 902. Graph layout manager 104 generates one or more SVG elements that visually represent the one or more communications networks and then generates SVG elements that indicate connections between those networks and nodes 906, 908, 910.

In the example shown in FIG. 9, a specification for network overlay layer 902 specifies a first logical network connected to a first node 906 by an extension point 912 (e.g., "NIC") and visually represented by a line element. Network overlay layer 902 further specifies a second logical network visually represented by a line element and connected to first node by an extension point 914 (e.g., "NIC2"), to a second node 908 by another extension point 916 (e.g., "NIC3"), and to a third node 910 by another extension point 918 (e.g., "NIC4"). Extension points 912, 914, 916, 918 are shown in phantom in FIG. 9.

To generate network overlay layer 902 within canvas 202, graph layout manager 104 generates a first SVG line element 920 representing a first logical network, as well as additional SVG marker elements for the depicted arrowheads. Graph layout manager 104 queries the base layer for extension point 912, and generates an SVG line element 922 (e.g., <polyline> connecting node 906 (at the position of extension point 912) to line element 920. Graph layout manager 104 generates a second SVG line element 924 representing the second logical network, and generates additional line elements 926 connecting nodes 906, 908, 910 at the positions of extension points 914, 916, 918, respectively, to line element 924. While the example network overlay layer is depicted in FIG. 9 using line annotations, it should be recognized that other graphical elements may be used to visually represent logical networks interconnecting the nodes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of generating a user interface, the method comprising:
   determining positions of a plurality of nodes and a plurality of child elements within the plurality of nodes according to a declarative layout, wherein the nodes and child elements visually represent a topology of virtual computing resources and application components executing thereon, wherein the declarative layout comprises an extension point associated with a first child element of the plurality of child elements;
   generating a base layer comprising a first plurality of scalar vector graphics (SVG) elements that renders the plurality of nodes and the plurality of child elements at the determined positions;
   identifying one or more layers of information to be overlaid on the base layer;
   retrieving supplemental information, from a virtualization component, for each of the one or more layers of information to be overlaid on the base layer, wherein the supplemental information is data associated with the plurality of nodes and application components of the topology;
   generating a second layer comprising a second plurality of SVG elements based on the extension point associated with the first child element, the supplemental information, and the identified one or more layers of information; and
   rendering, on a display device, a graphical user interface comprising the base layer and the second layer, wherein the second layer is rendered overlaid on the base layer.

2. The method of claim 1, wherein the extension point comprises a name identifier in an item declaration specifying layout properties of the first child element.

3. The method of claim 1, wherein the extension point comprises a name identifier in an item declaration of a container element containing the first child element.

4. The method of claim 1, wherein generating the second layer comprising the second plurality of SVG elements based on the extension point associated with the first child element further comprises:
   generating an item declaration that specifies content for the second layer; and
   inserting the item declaration into the declarative layout at a position based on the extension point associated with the first child element.

5. The method of claim 1, wherein the second layer comprises a network layer indicating a communications network connected to at least one node of the plurality of nodes.

6. The method of claim 1, wherein the second layer comprises a deployment status layer indicating success of deployment of the plurality of nodes and child elements at localized points of the base layer.

7. The method of claim 1, wherein generating the second layer comprising the second plurality of SVG elements based on the extension point associated with the first child element further comprises:
   instantiating a document object comprising an SVG element;
   modifying a position attribute and a size attribute of the document object based on the extension point; and
   inserting the document object into a web document.

8. A non-transitory computer-readable storage medium comprising instructions that, when executed in a computing device, generate a user interface, by performing the steps of:
   determining positions of a plurality of nodes and a plurality of child elements within the plurality of nodes according to a declarative layout, wherein the nodes and child elements visually represent a topology of virtual computing resources and application components executing thereon, wherein the declarative layout comprises an extension point associated with a first child element of the plurality of child elements;
   generating a base layer comprising a first plurality of scalar vector graphics (SVG) elements that renders the plurality of nodes and the plurality of child elements at the determined positions;
   identifying one or more layers of information to be overlaid on the base layer;
   retrieving supplemental information, from a virtualization component, for each of the one or more layers of information to be overlaid on the base layer, wherein the supplemental information is data associated with the plurality of nodes and application components of the topology;

generating a second layer comprising a second plurality of SVG elements based on the extension point associated with the first child element, the supplemental information, and the identified one or more layers of information; and rendering, on a display device, a graphical user interface comprising the base layer and the second layer, wherein the second layer is rendered overlaid on the base layer.

9. The non-transitory computer-readable storage medium of claim 8, wherein the extension point comprises a name identifier in an item declaration specifying layout properties of the first child element.

10. The non-transitory computer-readable storage medium of claim 8, wherein the extension point comprises a name identifier in an item declaration of a container element containing the first child element.

11. The non-transitory computer-readable storage medium of claim 8, wherein the steps for generating the second layer comprising the second plurality of SVG elements based on the extension point associated with the first child element further comprise:

generating an item declaration that specifies content for the second layer; and inserting the item declaration into the declarative layout at a position based on the extension point associated with the first child element.

12. The non-transitory computer-readable storage medium of claim 8, wherein the second layer comprises a network layer indicating a communications network connected to at least one node of the plurality of nodes.

13. The non-transitory computer-readable storage medium of claim 8, wherein the second layer comprises a deployment status layer indicating success of deployment of the plurality of nodes and child elements at localized points of the base layer.

14. The non-transitory computer-readable storage medium of claim 8, wherein the steps for generating the second layer comprising the second plurality of SVG elements based on the extension point associated with the first child element further comprise:

instantiating a document object comprising an SVG element;

modifying a position attribute and a size attribute of the document object based on the extension point; and inserting the document object into a web document.

15. A computer system for generating a user interface, comprising:

a display device; and a processor programmed to carry out the steps of:

determining positions of a plurality of nodes and a plurality of child elements within the plurality of nodes according to a declarative layout, wherein the nodes and child elements visually represent a topology of virtual computing resources and application components executing thereon, wherein the declarative layout comprises an extension point associated with a first child element of the plurality of child elements;

generating a base layer comprising a first plurality of scalar vector graphics (SVG) elements that renders the plurality of nodes and the plurality of child elements at the determined positions;

identifying one or more layers of information to be overlaid on the base layer;

retrieving supplemental information, from a virtualization component, for each of the one or more layers of information to be overlaid on the base layer, wherein the supplemental information is data associated with the plurality of nodes and application components of the topology;

generating a second layer comprising a second plurality of SVG elements based on the extension point associated with the first child element, the supplemental information, and the identified one or more layers of information; and rendering, on the display device, a graphical user interface comprising the base layer and the second layer, wherein the second layer is rendered overlaid on the base layer.

16. The computer system of claim 15, wherein the extension point comprises a name identifier in an item declaration specifying layout properties of the first child element.

17. The computer system of claim 15, wherein the extension point comprises a name identifier in an item declaration of a container element containing the first child element.

18. The computer system of claim 15, wherein the processor programmed to generate the second layer comprising the second plurality of SVG elements based on the extension point associated with the first child element is further programmed to carry out the steps of:

generating an item declaration that specifies content for the second layer; and inserting the item declaration into the declarative layout at a position based on the extension point associated with the first child element.

19. The computer system of claim 15, wherein the second layer comprises a network layer indicating a communications network connected to at least one node of the plurality of nodes.

20. The computer system of claim 15, wherein the second layer comprises a deployment status layer indicating success of deployment of the plurality of nodes and child elements at localized points of the base layer.

* * * * *